Patented Aug. 18, 1936

2,051,144

UNITED STATES PATENT OFFICE 2,051,144

PREPARATION OF ISOPROPYL ALCOHOL

Walter Philip Joshua, Cheam, Herbert Muggleton Stanley, Tadworth, and John Blair Dymock, Sutton, England No Drawing. Application October 4, 1933, Serial No. 692,221. In Great Britain October 18, 1932

6 Claims. (Cl. 260—156)

The present invention relates to the production of isopropyl alcohol by the direct combination of propylene with water vapor. According to this invention propylene and water vapor are caused to combine at high temperatures at atmospheric or increased pressures in the presence of a solid catalyst compounded from phosphoric acid with one or more of the metals manganese, copper, iron, cobalt or uranium or the oxides or other compounds thereof, the amount of phosphoric acid present in the catalyst being in excess of that required to form the orthophosphate of the metal or metals selected.

In addition to one or more of the metals it is advantageous to incorporate boron, the amount of phosphoric acid used in that event being in excess of that required to form the orthophosphate of boron as well as the orthophosphate of the metal or metals.

The catalyst may be used in the solid state in the form of granules, flakes and so forth or may be supported on inert carriers such as electrode carbon and the like, or these materials may be impregnated with the catalyst in liquid form, and subsequently dried. The reaction may be carried out at temperatures of 100–300° C. Atmospheric pressure may be employed or increased pressures up to 100 atmospheres.

The following examples illustrate the manner in which the invention may be carried into effect and the nature of the results obtained:—

Example I

A catalyst was prepared consisting of 2.6 molecules of phosphoric acid, one molecule of manganese oxide, and half a molecule of boric anhydride. Over 100 cc. of this catalyst, at a temperature of 250° C., propylene mixed with steam in the molar proportions of 11 mulecules of propylene to 9 molecules of steam, was passed, at a rate of 400 litres per hour (calculated at normal temperature and pressure) under a total pressure of 20 atmospheres. The hourly output of isopropyl alcohol was 17.95 grams. The alcohol was obtained in the form of a 6.73% condensate. A small amount of acetone was also formed.

Example II

Over the same amount of the same catalyst as in Example I and at a temperature of 250° C., propylene mixed with steam in the molar proportions of 15 molecules of propylene to 5 molecules of steam was passed at the same rate of flow and under the same pressure as in Example I. The hourly output of isopropyl alcohol was 13.15 grams, and the alcohol was obtained in the form of a 10.7% condensate. A small amount of acetone was also formed.

What we claim is:—

1. The method of producing isopropyl alcohol direct from propylene and water vapor, comprising subjecting a mixture of the propylene and water vapor to the action of an elevated temperature in the presence of a solid catalyst comprising essentially phosphoric acid and the phosphate of a metal taken from a group consisting of manganese, copper, iron, cobalt, uranium, the amount of phosphoric acid present in the catalyst being in excess of that required to form the orthophosphate of the metal or metals selected.

2. The method of producing isopropyl alcohol direct from propylene and water vapor, comprising subjecting a mixture of the propylene and water vapor to the action of a temperature ranging from 100° C. to 300° C. in the presence of a solid catalyst comprising essentially phosphoric acid and the phosphate of a metal taken from a group consisting of manganese, copper, iron, cobalt, uranium, the amount of phosphoric acid present in the catalyst being in excess of that required to form the orthophosphate of the metal or metals selected.

3. The method of producing isopropyl alcohol direct from propylene and water vapor, comprising subjecting a mixture of the propylene and water vapor to the action of a temperature ranging from 100° C. to 300° C. and an elevated pressure not exceeding 100 atmospheres in the presence of a solid catalyst comprising essentially phosphoric acid and the phosphate of a metal taken from a group consisting of manganese, copper, iron, cobalt, uranium, the amount of phosphoric acid present in the catalyst being in excess of that required to form the orthophosphate of the metal or metals selected.

4. The method of producing isopropyl alcohol direct from propylene and water vapor, comprising subjecting a mixture of the propylene and water vapor to the action of an elevated temperature in the presence of a solid catalyst comprising essentially phosphoric acid and the phosphate of a metal taken from a group consisting of manganese, copper, iron, cobalt, uranium, together with the phosphate of boron, the amount of phosphoric acid present in the catalyst being in excess of that required to form the orthophosphates of boron and of the metal or metals selected.

5. The method of producing isopropyl alcohol direct from propylene and water vapor comprising subjecting a mixture of the propylene and water vapor to the action of an elevated temperature in the presence of a solid catalyst comprising essentially phosphoric acid and the phosphate of manganese, the amount of phosphoric acid present in the catalyst being in excess of that required to form the orthophosphate of manganese.

6. The method of producing isopropyl alcohol direct from propylene and water vapor comprising subjecting a mixture of the propylene and water vapor to the action of an elevated temperature in the presence of a solid catalyst comprising essentially phosphoric acid and the phosphate of copper, the amount of phosphoric acid present in the catalyst being in excess of that required to form the orthophosphate of copper.

WALTER PHILIP JOSHUA.
HERBERT MUGGLETON STANLEY.
JOHN BLAIR DYMOCK.